No. 781,856. PATENTED FEB. 7, 1905.
J. B. WEIS.
COFFEE OR TEA URN.
APPLICATION FILED JUNE 17, 1904.
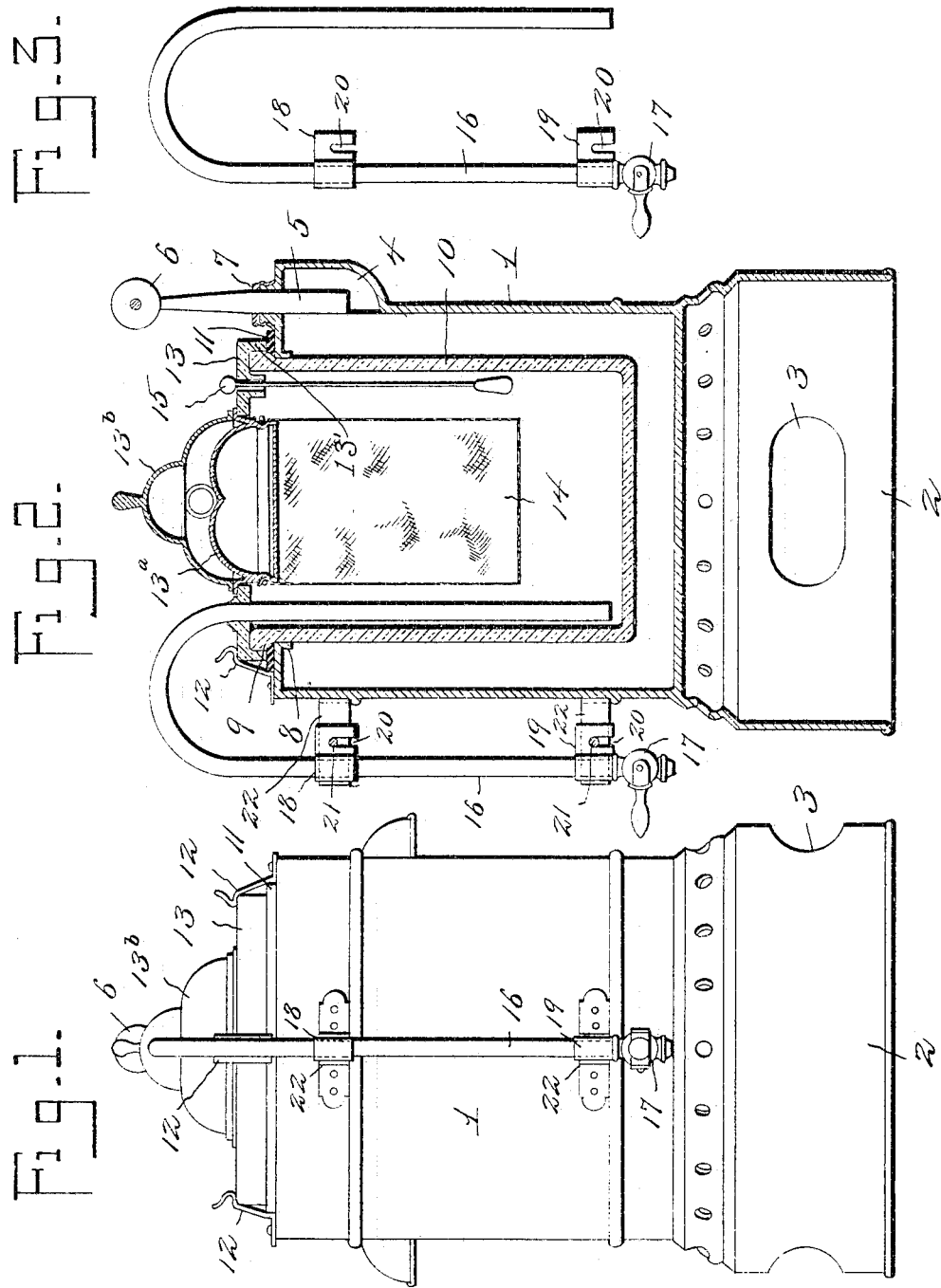
Witnesses: John B. Weis, Inventor,
by C. A. Snow & Co.
Attorneys.

No. 781,856. Patented February 7, 1905.

UNITED STATES PATENT OFFICE.

JOHN B. WEIS, OF TOLEDO, OHIO.

COFFEE OR TEA URN.

SPECIFICATION forming part of Letters Patent No. 781,856, dated February 7, 1905.

Application filed June 17, 1904. Serial No. 212,987.

*To all whom it may concern:*

Be it known that I, JOHN B. WEIS, a citizen of the United States, residing at Toledo, in the county of Lucas and State of Ohio, have invented a new and useful Coffee or Tea Urn, of which the following is a specification.

This invention relates generally to coffee or tea urns, and particularly to that class in which the eduction-tube is of siphon shape.

The object of the invention is in a ready, simple, and thoroughly practical manner to combine the siphon with the urn or boiler in such manner as to permit of its being readily detached without disturbing any of the other parts of the urn; to provide a novel form of alarm to give notification that the water in the urn is low; to provide a novel form of indicator to give visual notice as to the height of the coffee within the urn; to provide a novel form of seal for preventing escape of steam from the urn, and generally to improve, simplify, and increase the efficiency of coffee-urns of the character specified.

With the above and other objects in view, as will appear as the nature of the invention is better understood, the same consists in the novel form of coffee or tea urn, as will be hereinafter fully described and claimed.

In the accompanying drawings, forming a part of this specification, and in which like characters of reference indicate corresponding parts, there is illustrated one form of embodiment of the invention capable of carrying the same into practical operation, it being understood that the elements therein exhibited may be varied or changed as to shape, proportion, and exact manner of assemblage without departing from the spirit thereof.

In the drawings, Figure 1 is a view in side elevation. Fig. 2 is a view in vertical section of a coffee or tea urn constructed in accordance with the present invention. Fig. 3 is a detail view of the siphon detached.

The body portion of the urn or boiler (designated by 1) may be of the usual or any preferred construction and is provided with a base 2, having an opening 3, through which the hand of the user will be inserted in igniting the gas or other heating medium. To one side of the top portion of the urn there is arranged an offset 4, in which is disposed a tube 5, the upper end of which is provided with a whistle 6, which when the water in the boiler passes a predetermined level will notify the attendant that more water is needed. This tube is held associated with the offset by a nut 7. The body is provided with an inturned circumferential flange 8, which is engaged by the rim 9 of a crock or earthenware vessel 10, and between the rim and the flange is interposed a gasket 11, preferably of rubber, thus to prevent escape of steam from the crock, the crock being held in position within the urn-body through the medium of spring-clips 12.

Resting upon the upper edge of the vessel 10 is an annulus 13, having a downturned peripheral flange 13', engaging the gasket 11. The orifice of the annulus is engaged by a cap 13$^a$, which projects downward into the vessel and has secured to it in any suitable manner a fabric bag 14 for holding the coffee or tea, as the case may be. The cap is housed by a cover 13$^b$, which subserves the double function of inclosing the cap and also of giving an ornamental finish to the structure. The annulus is further provided with an orifice through which projects a float 15, which serves as a visual indicator to determine the depth of the liquid within the vessel 10. This float possesses features of advantage over the ordinary sight-glass gage in common use inasmuch as there is no danger of leakage and no especial care need be observed in handling the urn to prevent breakage, such as would be necessary with the ordinary form of device.

One of the essential features of the present invention resides in a novel form of siphon eduction-pipe, it being a desideratum, as above pointed out, to permit the siphon to be readily removed when found necessary or desirable. The siphon 16 carries on its longer or outer leg a valve 17 of the usual construction, the shorter leg of the siphon being disposed within the receptacle 10. Combined with the siphon in any preferred manner are two arms 18 and 19, having recesses 20 to engage pins or offsets 21, carried by pairs of brackets 22, secured to the urn-body. It will be seen by this arrangement that by lifting the siphon a sufficient distance to throw the recesses 20 out of engagement with the offsets 21 the siphon may readily be removed for purposes of cleansing or otherwise. Another advantage accruing from the arrangement shown is that should it be desired to cleanse the inner walls of the body portion 1 of the urn it will only be necessary to remove the siphon and annulus 13 without disturbing the coffee-percolating bag 14, and the crock 10 may be lifted from its position, thus leaving the interior of the body portion free of access.

From the foregoing description it will be seen that although the improvements of the present invention are simple in character they are thoroughly practical and advantageous and may be applied to coffee-urns already in use without requiring any radical change in their construction.

Having thus described the invention, what is claimed is—

1. A coffee or tea urn having its body portion provided with brackets, in combination with a siphon having arms to interlock with the brackets, the interlocking between the parts being such that the siphon may be disconnected from the urn by lifting the former.

2. A coffee or tea urn having its body portion provided with brackets carrying pins, in combination with a siphon having arms provided with slots, the lower ends of which are open to permit them to straddle the pins and be readily disconnected therefrom.

3. A coffee or tea urn comprising a body portion provided with brackets, in combination with a vessel arranged within the body portion, an annulus disposed upon the upper end of the vessel, and a siphon having one member projecting through the annulus and its other member provided with arms to interlock with the brackets, and to be freely detachable therefrom by lifting.

4. A coffee or tea urn comprising a body portion provided with brackets carrying pins, a vessel arranged therein, an annulus partly closing the upper end of the vessel, and a siphon having one of its members projecting through the annulus and its other member provided with arms having slots to straddle the said pins.

5. A coffee or tea urn comprising a body portion provided at its upper end with an inturned circumferential flange and intermediate of its ends with brackets, a vessel resting upon the flange, an annulus disposed upon the upper edge of the vessel, and a siphon having one member projecting through the annulus and its other member provided with arms to interlock with the brackets and to be freely disconnected therefrom by lifting.

In testimony that I claim the foregoing as my own I have hereto affixed my signature in the presence of two witnesses.

JOHN B. WEIS.

Witnesses:
  PETER J. METTLER,
  EDWARD W. METTLER.